May 15, 1934.    L. L. WILLIAMS    1,958,527
MOLDING
Filed Dec. 12, 1932
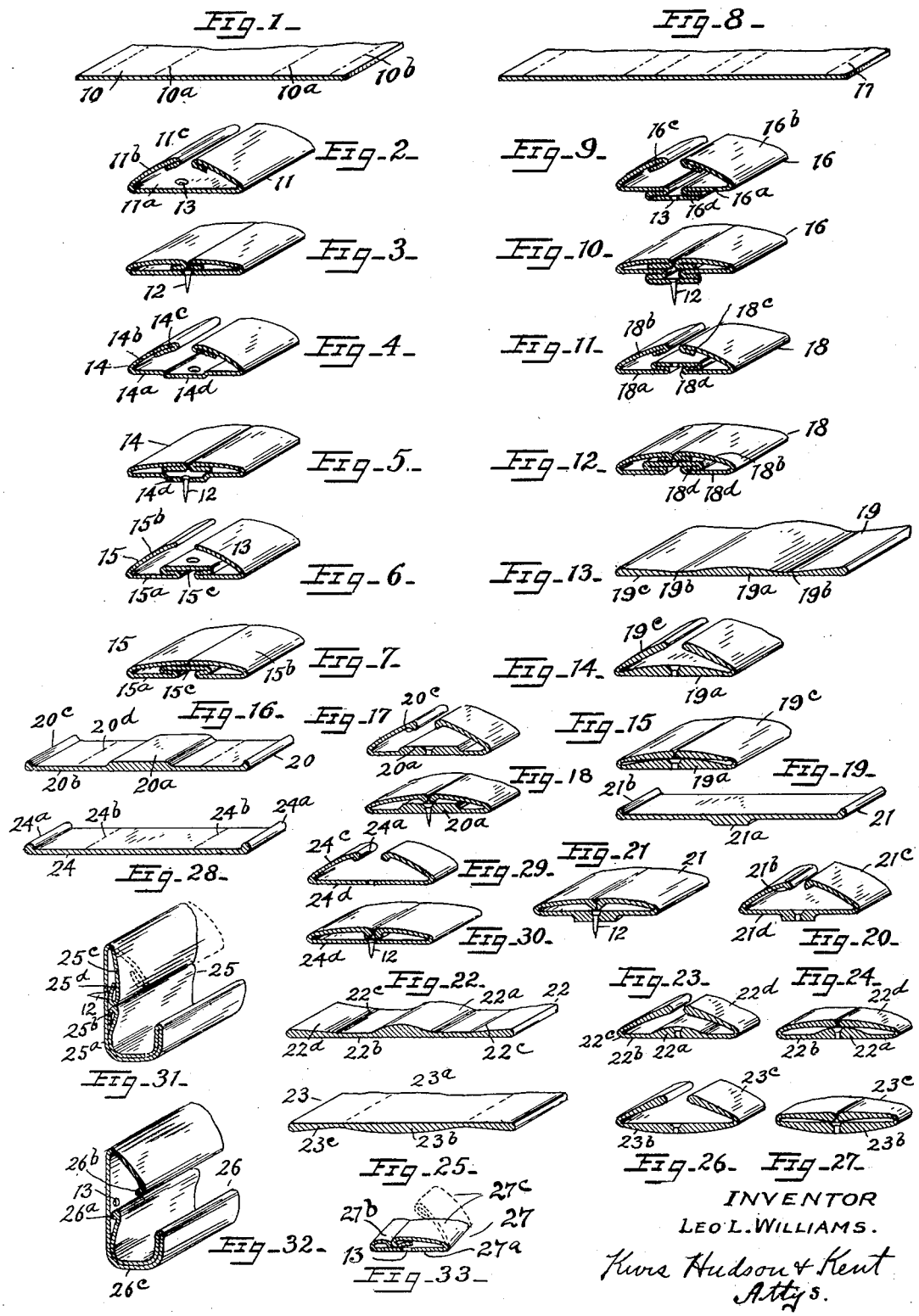
INVENTOR
Leo L. Williams.
Kwis Hudson & Kent
Attys.

Patented May 15, 1934

1,958,527

UNITED STATES PATENT OFFICE 1,958,527

MOLDING

Leo L. Williams, Cleveland Heights, Ohio

Application December 12, 1932, Serial No. 646,893

8 Claims. (Cl. 296—135)

This invention relates to moldings for automobile bodies which are applied to the latter for covering joints or as gutters along the sides of the top.

The most approved moldings which have been used in recent years are formed of extruded metal, generally aluminum, and are composed of a base or body through which attaching nails are adapted to be driven and of one or more wings or flanges adapted to be bent down onto the base over the attaching devices to cover and conceal them and to provide a finished shape for the molding which will constitute an ornamentation for the automobile body by being provided with a pleasing contour of smooth, rounded or other predetermined shape. Moldings such as referred to above are illustrated in my prior Patents No. 1,714,478, No. 1,714,479, and No. 1,771,386.

In the development of these moldings, it was found quite important that the base or wing or wings, or both, be so shaped that in the closing operation the wing or wings would be stopped at a given point or would assume the right position so as to give the predetermined external shape to the molding without expensive filing or grinding operations. Highly successful moldings with these developments incorporated therein are illustrated in the second and third of my prior patents referred to above.

The principal object of the present invention is to provide moldings which may be formed by being bent up from strips of plain or specially rolled steel or other suitable metal and which may be readily formed by rolls or otherwise into the shape that the molding is to assume when marketed or applied to the automobile bodies and which when closed will assume the desired shape.

More particularly, it is the aim of the invention to provide moldings which are considerably less expensive than the extruded moldings of aluminum or the like and which therefore do away with the necessity for expensive extruding dies but which will nevertheless serve the purpose heretofore served by the extruded moldings.

The method of making the herein disclosed moldings is disclosed and claimed in my copending application Serial Number 717,612, filed March 27, 1934.

In the accompanying sheet of drawings, I have shown several forms of moldings embodying the present invention, some of these moldings being made from strips of plain rolled or sheet metal of uniform cross-section, and others of special rolled metal of varying cross-section.

Referring now to the drawing:

Fig. 1 is a perspective view of a strip of rolled or sheet metal of uniform thickness prior to any bending operation.

Fig. 2 is a perspective view of a short section of the molding made from the strip of uniform cross-section shown in Fig. 1 and ready to be applied to an automobile body.

Fig. 3 is a similar view showing the molding closed over the attaching devices.

Figs. 4 and 5 are views similar to Figs. 2 and 3 showing a modification.

Figs. 6 and 7 are views similar to Figs. 2 and 3 showing a further modification.

Fig. 8 is a view similar to Fig. 1, showing a strip of rolled or sheet metal of uniform thickness somewhat wider than the strip shown in Fig. 1, and utilized in forming moldings such as illustrated in Figs. 9 and 10.

Figs. 9 and 10 are views similar to Figs. 2 and 3, showing a molding made from the strip of Fig. 8 and utilizing more stock in forming it.

Figs. 11 and 12 are views similar to Figs. 2 and 3 showing moldings made from the same width of stock as shown in Fig. 8, but modified over the form shown in Figs. 9 and 10.

Fig. 13 is a view similar to Fig. 8 showing a specially rolled sheet of metal utilized in forming moldings such as shown in Figs. 14 and 15.

Figs. 14 and 15 are views corresponding to Figs. 2 and 3 showing respectively an open and closed molding made from the strip of Fig. 13.

Fig. 16 is a view similar to Fig. 13 but showing a specially rolled strip of a different cross-section from that shown in Fig. 13.

Figs. 17 and 18 are views similar to Figs. 2 and 3 showing respectively an open and closed molding formed from the strip of Fig. 16.

Fig. 19 is a view similar to Figs. 13 and 16 showing still another form of specially rolled strip.

Figs. 20 and 21 are views similar to Figs. 2 and 3 and showing respectively an open and closed molding formed from the strip of Fig. 19.

Fig. 22 is a view similar to Figs. 13, 16 and 19 showing another form of specially rolled strip.

Figs. 23 and 24 are views similar to Figs. 2 and 3 showing respectively an open and closed molding formed from the strip of Fig. 22.

Fig. 25 is a view similar to Figs. 13, 16, 19 and 22, showing another form of specially rolled strip.

Figs. 26 and 27 are views similar to Figs. 2 and 3 showing respectively an open and closed molding formed from the strip of Fig. 25.

Fig. 28 is a view similar to Figs. 13, 16, 19, 22 and 25 showing a still different form of specially rolled strip.

Figs. 29 and 30 are views similar to Figs. 2 and 3 showing respectively an open and closed molding formed from the strip of Fig. 28.

Fig. 31 shows a drip molding formed from a plain strip of rolled or sheet metal of uniform cross-section such as shown in Figs. 1 and 8, the flange which covers the attaching devices being shown by dotted lines in open position and by full lines in the closed position.

Fig. 32 is a similar view of a drip molding formed from a specially rolled strip such as illustrated in Fig. 28, and Fig. 33 is a fragmentary perspective view showing a belt molding wherein only one wing or flange is folded inwardly to cover the attaching devices and to make a tightly closed joint.

Rolled metal strips formed of different metals may be employed with all forms of the invention as long as they possess the right degree of flexibility, durability, stiffness, and like qualities. I propose to use sheet steel for this purpose, but possibly other metals or alloys could be used advantageously. It is a characteristic of the invention that by utilizing the materials and methods now under consideration there is a considerable saving in metal, less expensive material is utilized compared with metals which are extruded and there is avoided the use of extruding dies which at times are very difficult and expensive to form. On the other hand my present moldings are formed by folding or bending a strip which can be bent into the desired form rapidly in one or more operations, generally by rolling processes. With many of the forms of the invention herein illustrated, the heads of the attaching devices are adapted to be covered and the molding closed by folding down onto the base two wings or flanges which characterize many of the moldings illustrated in my prior patents. To impart the right shape to the molding when it is closed, i. e., to cause the metal to fold down properly and to be stopped at the right point so that the molding will have the desired contour on its outer face, thickened portions are provided either on the flanges or on the base by folding the metal upon itself. I might state, however, that it is not essential to the invention that the molding be provided with two wings which fold down to cover the attaching devices, but in the broadest aspects of the invention, a single wing or flange may be employed to cover the attaching devices and to give a smooth or desirable contour to the exterior of the molding when it is closed. Therefore, while I have illustrated in Figs. 1 to 30 moldings which are of the double flange or double wing type, I do not desire to be confined to that type.

Heretofore sheet metal moldings have been proposed consisting of a base and a wing which was to be folded down, with the base and wing of the same uniform thickness, but moldings of this type were not satisfactory due to the fact that at the fold the metal is higher than at the point where the free edge of the wing or flange engages the base portion, and, furthermore, the free edge of the wing or flange would not adhere closely to the base. With all forms of my invention, by giving certain folds to the metal, a tight closure is obtained and the folded flange or flanges form or impart the right contour to the outer face of the molding.

Considering first the moldings produced from rolled metal of uniform thickness, I start with a flat strip of metal of predetermined thickness, such, for example, as metal of 22 U. S. S. gauge (which, however, may be varied considerably) and of a width depending largely upon the folds which are to be imparted to the different parts. No particular length of strip is required as the molding can be produced in continuous fashion or by a continuous process by running the strip through suitable forming rolls.

In Fig. 1 I have shown at 10 a metal strip such as referred to. From this strip there may be formed a plurality of forms of moldings, such as the molding 11 of Fig. 2 having a base portion 11a and two continuous wings or flanges 11b which, when the molding is open, extend out from the marginal portions of the base at a suitable angle so that the free edges of the flanges are a sufficient distance apart to permit the insertion of nails or other attaching devices 12 inserted through the openings 13 formed at intervals in the base and in this instance centrally thereof. These openings may be countersunk or not, as may be found desirable. The wings or flanges 11b are formed by folding over portions of the strip 10 along the parallel dotted lines 10a of Fig. 1. A sharp bend is not essential, in fact the bend is preferably somewhat rounded, as indicated in Figs. 2 and 3.

In order to form stops for the flanges when the molding is being closed and thereby provide a closed molding which has a pleasing contour and which is as high if not higher at the center than at its edges, the flanges 11b have their edge portions folded back or inwardly, as indicated at 11c, these inturned folds being formed by folding inwardly the strip 10 along the lines 10b. These inward folds 11c on the underside of the wings or flanges 11b form rounded edges at the free ends of the flanges, and when the molding is closed, as indicated in Fig. 3, these folds 11c engage the base and the rounded edges of the flanges or wings are in firm contact or in solid abutting engagement with each other.

In Figs. 4 and 5 I show a slightly different form of molding which requires about the same or possibly a slightly wider strip 10. This molding 14 has a base 14a, two flanges or wings 14b with inturned folds 14c, as in the molding 11. In this instance, the base 14a has its central part disposed as indicated at 14d forming a shallow depression on the inner side of the base which, of course, extends the full length of the molding and on the outer side a thin rib. The holes 13 for the attaching devices 12 are provided centrally of this shallow depression, the latter forming a space for the heads of the attaching devices 12 and making it unnecessary to countersink the openings 13. The shallow rib 14d on the outer side of the base may fit into a depression in the body to which the molding is applied.

When this molding is closed, as indicated in Fig. 5, the free edges of the flanges or wings solidly engage, as in Fig. 3, and the inward folds 14c contact the inner side of the base and stop the inward folding movement of these flanges or wings, the width of these folds being sufficient to cause them to engage the base just beyond or on opposite sides of the depression 14d.

The molding 15 shown in Figs. 6 and 7 has a base portion 15a, and two flanges or wings 15b, but in this instance the inward folds at the free edges of the wings are omitted, and the stop for limiting the inward folding movement of the flanges or wings during the closing operation is provided by forming centrally of the base a ridge or pier 15c which extends on the inner side of the molding, this being formed by giving two double folds to the strip. Centrally of the pier there is a single thickness of metal in which the openings 13 for the attaching devices are formed, while along the sides of the pier there is a triple thickness of metal formed by the two double folds. When the molding is closed, the wings fold down on top of the pier, as shown in Fig. 7 with their edges solidly abutting.

In Figs. 9 and 10 the molding 16 has a base 16a, two wings or flanges 16b at the free edges of which are inturned folds 16c, as with the moldings 11 and 14 of Figs. 2 to 5 inclusive, and in this instance the base is provided on its underside with a rib 16d formed by giving portions 17 of the strip (Fig. 8) double folds but in the reverse manner to that indicated in Figs. 6 and 7. This forms on the underside of the base of the molding a rib which may fit into a depression in the body to which the molding is to be applied and forms centrally of the inner side of the base a longitudinally extending narrow depression wide enough to receive the openings 13 for the attaching devices 12 and of course wide enough to receive the heads of the attaching devices. When the molding is closed, the inturned folds 16c engage the inner side of the base on opposite sides of this depression or channel just referred to. The fold lines for producing this molding 16 are shown in dotted lines in Fig. 8.

In Figs. 11 and 12 I have shown a molding 18 having both the inturned folds of moldings 11 and 14 and the pier of molding 15. Here the molding has a base 18a, two flanges or wings 18b with the inturned folds 18c and the pier 18d extending up from the inner side of the base centrally thereof, this pier being formed precisely as in the molding 15 shown in Figs. 6 and 7 by giving portions of the strip double folds, leaving a single thickness of metal at the center in which are provided the openings 13 for the attaching devices.

In the closing operation, the wings are folded inwardly, as before, until the inturned folds 16c come in contact with the upstanding rib or pier of the base, forming a double stop for the wings and producing a thicker molding when it is closed, or with a more distinct curvature of smaller radius, than the moldings previously described.

The next moldings to be described are formed from specially rolled strips of steel or other suitable metal which may be readily folded, and in these moldings the strip is of non-uniform or of varying thickness to provide stops on the wing portions or base, or both, so that the molding will have the desired contour when closed.

In Fig. 13 is shown a rolled strip 19 with a middle portion 19a which, when the molding is formed, forms its base, this portion being higher at the center and from the center tapering off with a suitable curvature to fold lines 19b of reduced thickness, the distance between which is about one-half the width of the strip, and then beyond these fold lines this strip gradually increases in thickness to the free edges thereof, these portions being designated 19c and forming the flanges or wings of the molding when the strip 19 is run through the forming roll. The holes for the attaching devices are formed as before centrally of the base 19a. Here there is formed a molding having a base of gradually increasing thickness to the center and wings of gradually increasing thickness to their free edges.

When the molding is closed, the free edges of the wings 19c solidly abut as before, forming a closed seam or joint, and they come to a stop on the central part of the base where the greatest thickness occurs, leaving clearances from the points where the wings engage the base to the fold lines, the thickened base and the thickened wings forming a smooth, rounded top for the closed molding.

In Fig. 16 I have shown at 20 another specially rolled strip for forming the molding of Figs. 17 and 18. This molding has a thickened central portion 20a forming a central rib or pier on the inner side of the base of the molding (Fig. 17). Outwardly of the pier the strip has a relatively thin or reduced portion 20b, and the free edges of the strip have thickened portions in the form of beads 20c. One side of the strip is flat or in the same plane, whereas the pier and the beads project in the same direction on the other side of the strip.

The molding 20 of Fig. 17 is formed by bending the strip along the dotted lines 20d, i. e., at a suitable distance on opposite sides of the central thickened portion 20a, to the position shown in Fig. 17. The openings 13 for the attaching devices are formed in this pier, as indicated in Fig. 17. The length of the wings is such that when the molding is closed so as to conceal the attaching devices the ribs or beads 20c engage the thickened base portion or pier 20a and at the same time the free edges of the flanges or wings which are designated 20e solidly engage each other. The added thickness produced by the central thickened portion 20a and the beads 20c relative to the thickness where the fold is accomplished, stops the inward folding movement of the wings 20e in the folding operation so as to leave the thickness of the closed molding at the center considerably greater than the thickness at the edges of the closed molding. That is to say, when the flanges or wings are folded down to close the molding and to conceal the attaching devices, there is a clearance on the inside of the molding between the fold lines and the edge portions of the flanges or wings where they engage the thickened portion of the base and a smooth rounded contour having the desired radius of curvature is provided from one edge of the closed molding to the other.

In Fig. 19 I show a specially rolled strip 21 having at the center on one side a thickened portion 21a and at its free edges on the opposite side beads 21b substantially as in Fig. 20, with a smooth, unbroken surface from one bead to the other on the upper side of the strip, and with a thickness between the beads on one side and the central thickened portion 21a on the other side such that in the rolling or other forming operation in which the open molding of Fig. 20 is formed, the flanges or wings 21c of Figs. 20 and 21 can be readily turned up at the desired angle and in the closing operation, after the molding is applied to the body, the flanges can be readily folded down or inwardly onto the base 21d until the thickened edges or beads 21b come in contact with the flat upper face of the base in the manner indicated in Fig. 21. The beads form stops which limit the inward folding movement and cause the molding to have the desired or predetermined contour, while at the same time the free edges of the molding come into solid abutting engagement, as in the other moldings herein illustrated. The holes for the attaching devices are arranged centrally as before, and the thickened portion 21a forms a ridge on the underside of the base which may be received in a recess in the body at the joint which is to be covered by the molding.

In Fig. 22 I show a special rolled strip 22 having on what may be considered the upper side of the strip a central rounded thickened portion or pier 22a and outwardly of this on both sides reduced portions 22b of uniform thickness and terminating in fold lines 22c. Outwardly of these fold lines 22c are the wing portions 22d which are of greatest thickness at their edges. In this case, the thickness of the wing portions gradually increases from the fold lines to the edges of the strip. In the forming operation, the molding of Fig. 23 is formed, the wings simply being bent inwardly as before along the fold lines to the position shown in Fig. 23, and when the molding is closed the wings are folded inwardly until their free edges rest upon the central part of the thickened portion 22a. The clearance on the inside of the molding between the fold lines and where the flanges engage the thickened portion of the base makes it possible to readily close the molding with a smooth rounded contour from one edge of the closed molding to the other.

In Fig. 25 I have shown still another specially rolled strip at 23. Here the upper side of the strip which forms the inner side of the base and the inner side of the wings is smooth or in one plane from one edge of the strip to the other, whereas on what may be termed the lower side of the strip which forms the underside of the base and the top surface of the wings, the strip has an uneven contour so far as thickness is concerned. The fold lines for the wings, which are indicated at 23a, are shown in Fig. 25 by dotted lines. Between these fold lines and in this instance extending from substantially one fold line to the other, the strip on the underside has a thickened portion 23b forming a rounded base and from the fold lines to the edges of the strip the wing portions 23c are of gradually increasing thickness. In the forming operation, the molding as shown in Fig. 26 is formed.

In the closing operation, the flanges or wings are folded inwardly as before so that their thickened edge portions engage the central part of the base and form stops to limit the inward folding movement, there being a clearance between the fold lines 23a and the points or lines where the wings engage the base so that a smooth contour is given to the upper outer surface of the closed molding when it is attached to an automobile body, it being understood that the free edges of the flanges or wings come into solid abutting engagement in the closing operation, as shown in Fig. 27.

In Fig. 28 there is shown at 24 still another specially rolled strip which at its edges is provided on one side with beads or lips 24a, these projecting up on what may be termed the upper side of the strip which forms the inner side of the base and the inner sides of the wings or flanges. Between these beads the wing is of uniform thickness and of such thickness that it can be readily folded along the fold lines 24b shown by dotted lines to form the angularly disposed wings 24c having the beads 24a and projecting inwardly toward the base 24d. This molding, therefore, is very similar to that shown in Fig. 2 for when the molding is closed, the beads act as stops and engage the central part of the base, the engagement taking place when the free edges of the flanges or lips at the beads come into solid abutting relationship. These beads, like the inward folds 11c of Fig. 2, stop the wings at the right position, i. e., keep the wings from being bent inwardly too far, and thus the closed molding shown in Fig. 30 has a smooth contour from one edge to the other.

In Fig. 31 I have shown a drip molding 25 which is formed by bending or folding a strip of uniform cross-section, such as is utilized in the production of the moldings shown in Figs. 2 to 12. The gutter portion 25a of this molding is formed by giving the strip a trough-shape and doubling it upon itself with one of the free edges of the strip provided with an inward fold 25b to form a shoulder which is at the back wall of the molding or on the far side of the trough. At the top of the molding there is a wing or flange 25c normally extending forwardly from the rear wall at an angle indicated by the dotted lines. The free edge of the strip is folded inwardly, as shown at 25d, the two infolds 25b and 25d at opposite edges of the strip forming thickened portions or shoulders which abut when the flange 25c is folded down over the attaching devices 12 which extend through openings formed in the back wall of the molding just above the shoulder 25b. Furthermore, the thickened portion or in-fold 25d on the underside of the flange 25c forms a stop which limits the inward folding movement of the flange in the closing operation, and the thickened portion formed by the in-fold 25b and the shoulder which the thickened edge of the flange abuts form in the closed molding a smooth, rounded contour such as is desired.

In Fig. 32 there is shown at 26 a molding which is identical with that shown in Fig. 31 except that it is formed from a specially rolled strip having beads 26a and 26b at its edges. The trough 26c is formed of a double thickness of the strip, as in Fig. 31, with the bead 26a engaging the back wall of the strip forming a thickened portion and shoulder against which the thickened portion of the flange 26d abuts in the closing operation, the bead 26d forming a stop which limits the inward folding movement of the flange when the latter is folded inwardly to cover the attaching devices so that when the molding is closed not only do the thickened or shoulder portions where the beads are located solidly engage each other so as to form a tightly closed molding, but the front face of the molding from the top edge to the bottom of the trough has a rounded contour such as is desired.

It was mentioned above that these moldings are adapted for automobile bodies. However, they may be used on other parts of vehicles or may be utilized on other things besides vehicles.

It has already been mentioned that two wings or flanges are not necessary features of this invention. This is obvious from an inspection of the drip moldings shown in Figs. 31 and 32, but it may be used also for the belt moldings shown in the other figures. In that event, the moldings may be formed with one of the flanges closed or folded down onto the body when the molding is first produced so that in the closing operation only one flange need be pressed down into place to cover the attaching devices. This is illustrated in Fig. 33 wherein the molding 27 is in this instance formed from a plain strip of sheet metal like the moldings of Figs. 2 to 12. This molding has a base portion 27a with openings for the attaching devices, and it has a flange portion 27b folded inwardly onto the base when the molding is formed. Additionally, it has one inwardly foldable flange 27c which normally extends up from the base at an angle indicated by the dotted lines and is folded down onto the base in the closing operation to cover the attaching devices. Both the flange 27b, which is folded inwardly during the process of forming the molding, and the flange 27c, which is folded inwardly in the closing operation, have inwardly turned edge portions forming shoulders which abut in the closing operation to give the rounded desired contour to the outer face of the closed molding. At the same time, the in-folds on both wings or flanges act as stops, precisely as in the prior moldings. It will be observed that in this instance, where the belt molding has a single wing or flange which is folded inwardly in the closing operation, the inwardly foldable flange, here designated 27c, is wider than the flange 27b which is folded inwardly in the process of making the molding and before it is attached to the automobile body.

It will be understood, of course, that the one wing or flange belt molding may be formed from the specially rolled strips with the shoulders and stops produced by thickened portions or beads, as in the specially rolled strips previously described.

It has been mentioned in connection with the description of each of the above moldings that the in-folds or thickened portions at the tips or margins of the wing or wings act as stops but I wish to point out that they also perform another important function, to-wit, they give the adjoining edge portions of the strip a finished appearance which could not be obtained simply by the raw edge of the strip, i. e., of single thickness where the edges engage.

The moldings are generally closed by a tool which is placed on the contiguous portions of the two wings or on the single flange or wing, if the molding is so formed, and is run along the length of the molding so that the closing operation can be performed very rapidly with a uniform closing effect and tightness for the full length of the molding.

With all forms of the molding herein described, there is a minimum amount of metal and an inexpensive metal is utilized available from a large number of sources, but what is equally important from the standpoint of economy is the fact that the molding in all its forms can be produced very rapidly when the folding or forming equipment generally in the form of rolls is provided.

While I have shown several forms of the invention, I do not wish to be limited to these forms as the invention may be embodied in still additional forms.

Having thus described my invention, I claim:

1. A molding of the character described formed from a strip of rolled sheet metal and having a thickened base portion formed from an intermediate portion of the strip and wing portions formed from the side portions of the strip and folded inwardly with respect to the base portion, said base portion being deformed adjacent the center thereof whereby the base portion is thickened and is provided on one side thereof with a longitudinal recess and on the other side with a longitudinal rib, said wing portions being adapted to be folded further to close the molding and overlie the deformed base portion to thereby conceal attaching devices extending through the base portion.

2. A molding of the character described formed from a strip of rolled sheet metal and having a thickened base portion formed from an intermediate portion of the strip and wing portions formed from the side portions of the strip and folded inwardly with respect to the base portion, said base portion being deformed adjacent the center thereof to thicken the same and to provide a longitudinally extending recess interiorly of the molding and a longitudinally extending projecting rib on the back of the molding, said wing portions being adapted to be folded further to close the molding and to overlie said recess whereby attaching devices extending through the bottom of said recess are concealed.

3. A molding of the character described formed from a strip of rolled sheet metal and having a thickened base portion formed from an intermediate portion of the strip and wing portions formed from the side portions of the strip and folded inwardly with respect to the base portion, said base portion being deformed adjacent the center thereof to thicken the same and to provide a longitudinally extending recess interiorly of the molding, said wing portions being adapted to be folded further to a closed position overlying said recess and concealing attaching devices extending through the bottom of the recess and said wing portions having folded parts forming thickened portions which engage said base portion along opposite sides of said recess when the wing portions are in the closed position.

4. A molding of the character described formed from a strip of rolled sheet metal and having a base portion formed from an intermediate portion of the strip and wing portions formed from the side portions of the strip and folded inwardly with respect to the base portion, said base portion having double folds formed thereon on each side of its longitudinal center line thereby providing the base portion with a recess on one side thereof and with a rib on its opposite side, said wing portions being adapted to be folded further to a closed position overlying said double folds and concealing attaching devices extending through the base portion between the double folds.

5. A molding of the character described formed from a strip of rolled sheet metal and having a base portion formed from an intermediate portion of the strip and wing portions formed from the side portions of the strip and folded inwardly with respect to the base portion, said base portion having double folds formed therein on each side of its longitudinal center line, said double folds being arranged to provide a longitudinally extending narrow recess on the inner side of the base portion adapted to receive attaching devices and a longitudinally extending rib on the outer side of the base portion, said wing portions being adapted to be folded further to close the molding and conceal the attaching devices.

6. A molding of the character described formed from a strip of rolled sheet metal and having a base portion formed from an intermediate portion of the strip and wing portions formed from the side portions of the strip and folded inwardly with respect to the base portion, said base portion having double folds formed therein on each side of its longitudinal center line, said double folds being arranged to provide a longitudinally extending narrow recess on the inner side of the base portion adapted to receive attaching devices and a longitudinally extending rib on the outer side of the base portion, said wing portions being adapted to be folded further to close the molding and conceal the attaching devices, said wing portions having infolded parts at their edges constituting thickened shoulders which abut each other and overlie said recess when the wing portions are in the closed position.

7. A molding formed from a strip of sheet metal and having a base portion formed from an intermediate portion of the strip and wings formed from the side portions of the strip and folded inwardly with respect to the base portion, said base portion being deformed whereby the same is provided with a longitudinal recess to accommodate attaching devices extending through the base portion, said wings being adapted to be folded further to a closed position in engagement with the base portion on opposite sides of the recess with portions of the wings extending over the recess and into substantially meeting relation with each other to conceal said attaching devices.

8. A molding formed from a strip of sheet metal and having a base portion formed from the intermediate portion of the strip and wings formed from the side portions of the strip and folded inwardly with respect to the base portion, said base portion being deformed whereby the same is provided with a longitudinal recess interiorly of the molding to accommodate attaching devices extending through the base portion, said wings being adapted to be folded further to a closed position in engagement with the base portion on opposite sides of the recess with portions of the wings overhanging the recess and extending into substantially meeting relation with each other to conceal said attaching devices.

LEO L. WILLIAMS.